April 20, 1954   T. T. YOUNGFELT   2,675,929
HANDLING SYSTEM FOR BOARDLIKE ARTICLES
Filed June 28, 1946   9 Sheets-Sheet 1
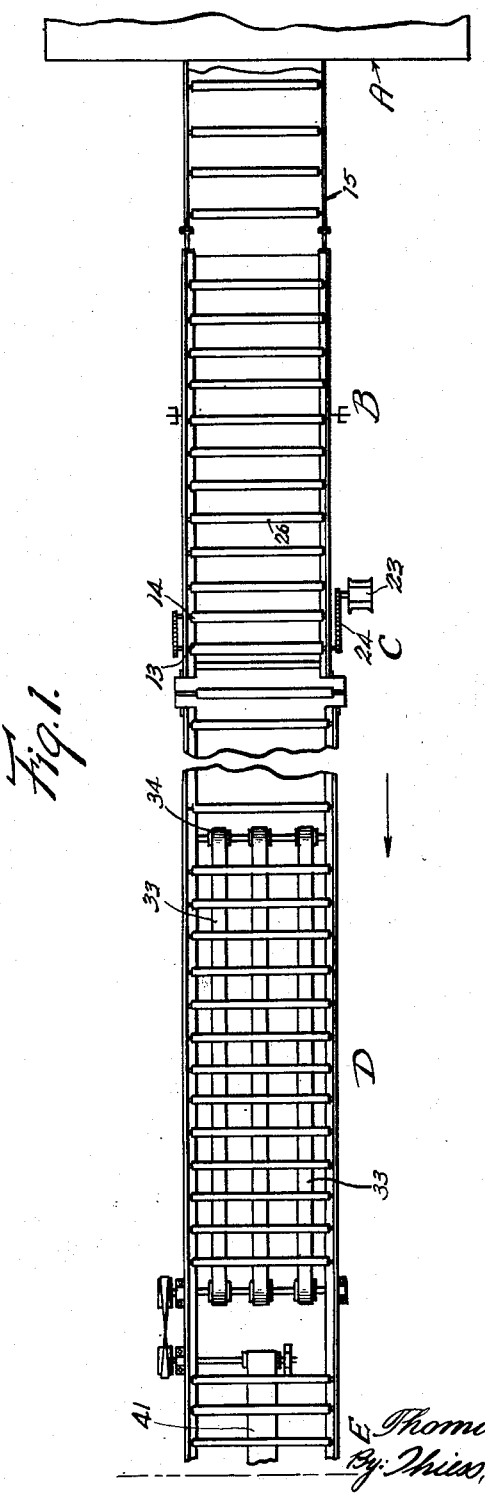

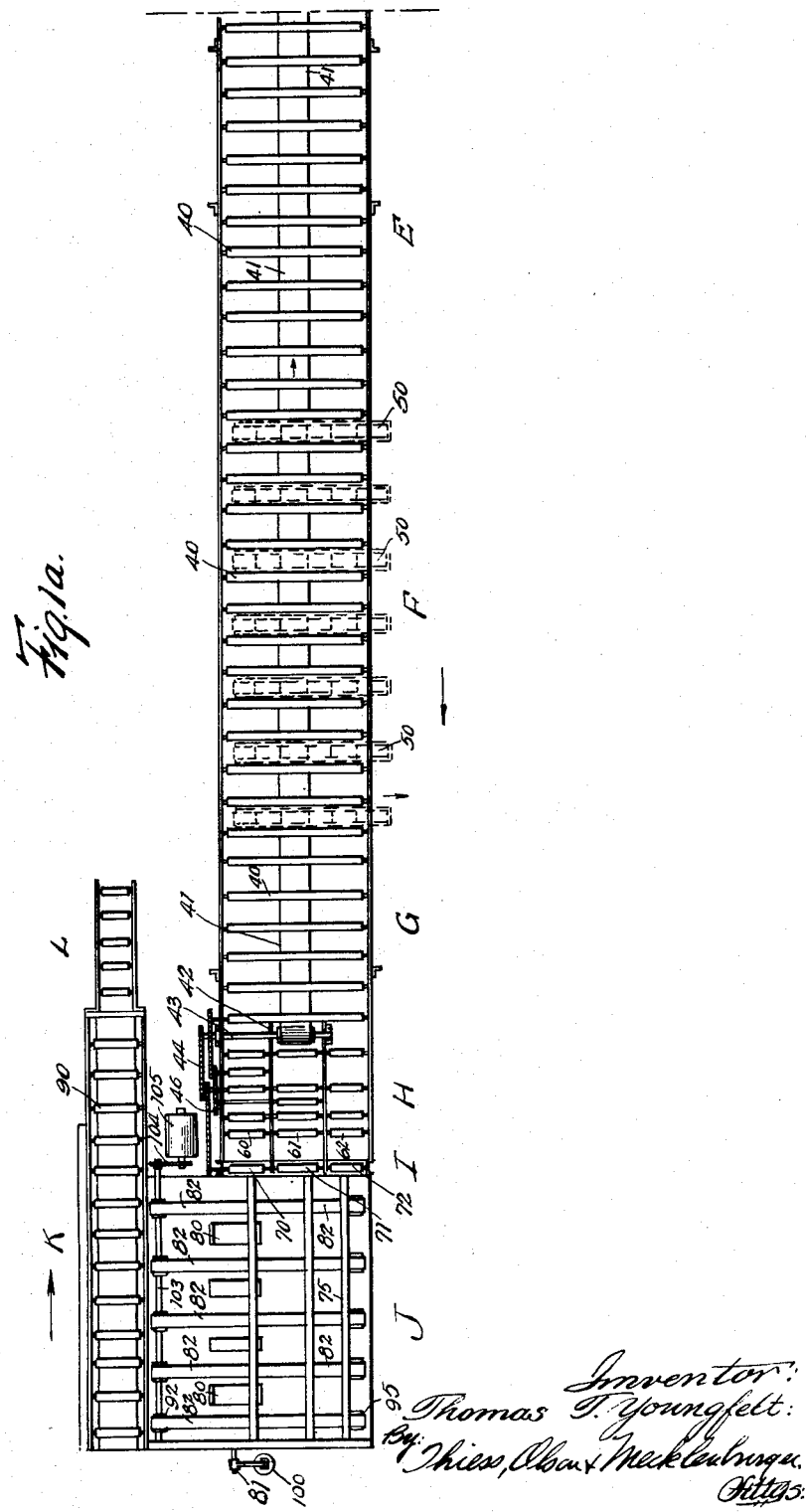

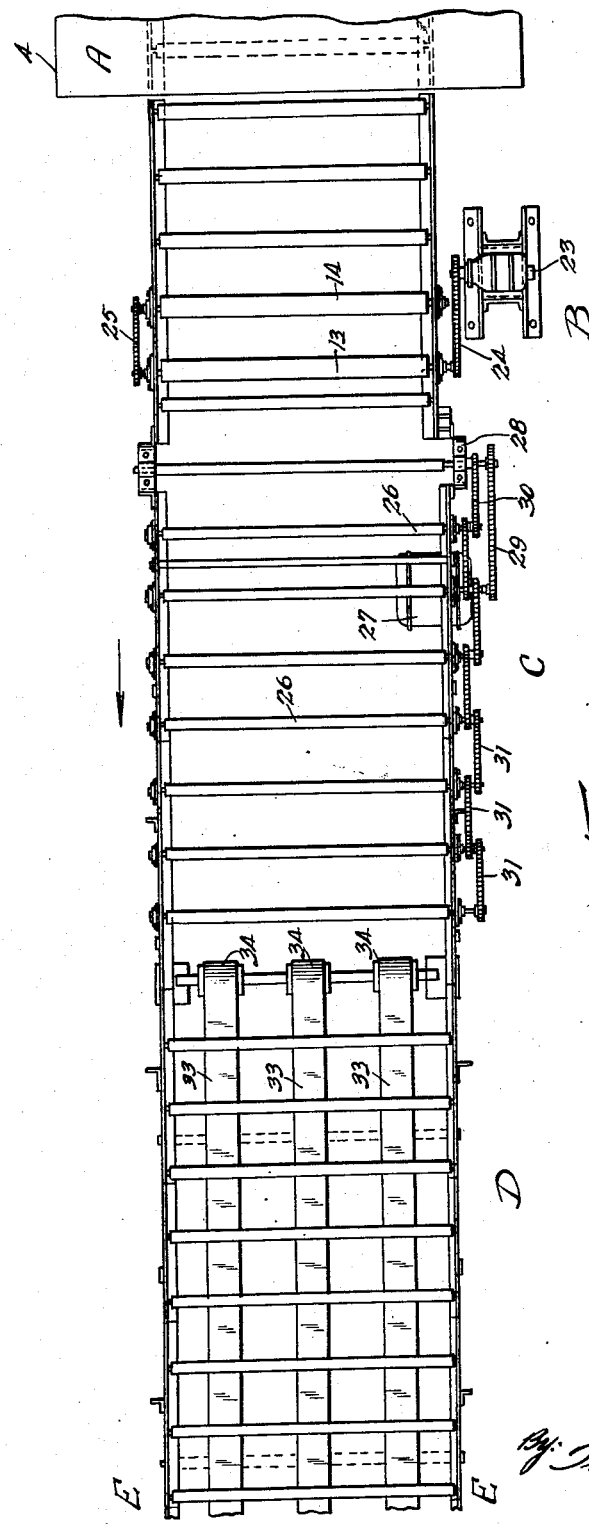

April 20, 1954     T. T. YOUNGFELT     2,675,929
HANDLING SYSTEM FOR BOARDLIKE ARTICLES
Filed June 28, 1946     9 Sheets-Sheet 4
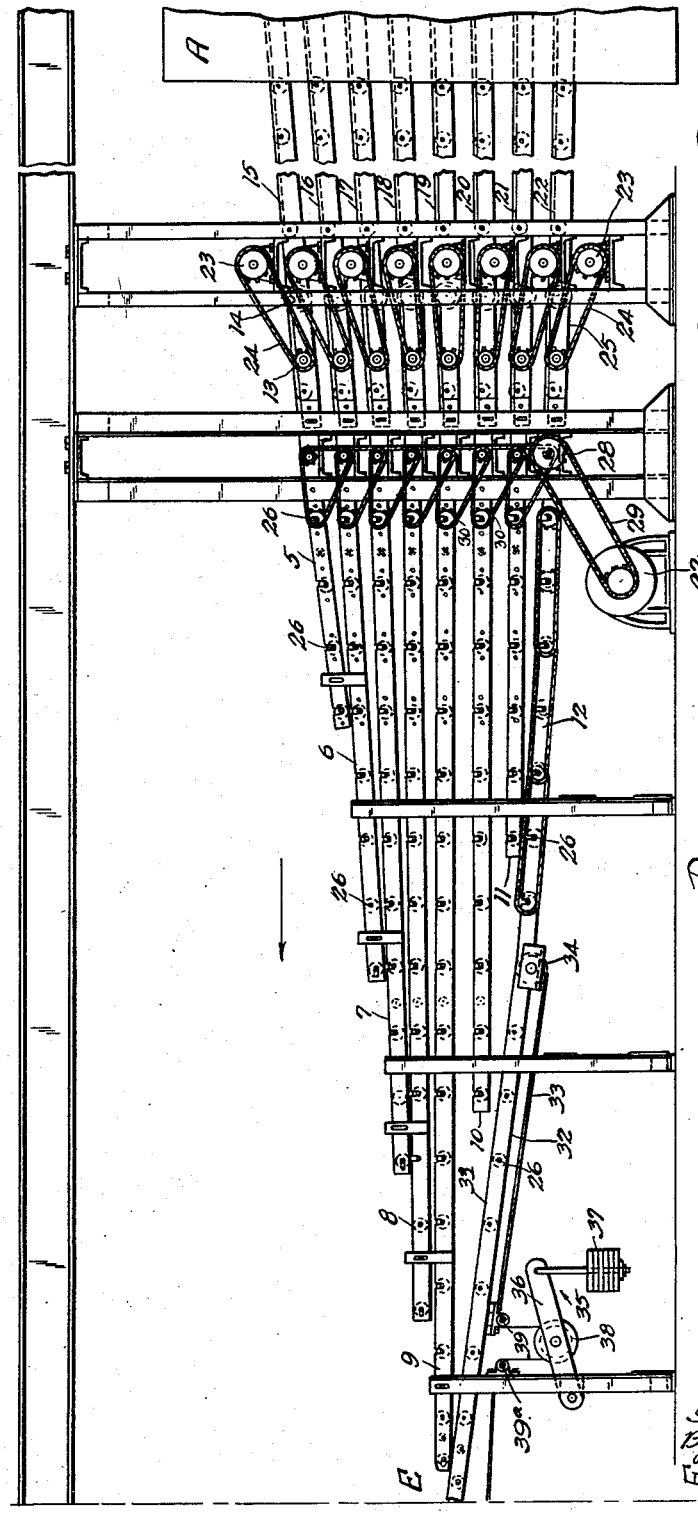

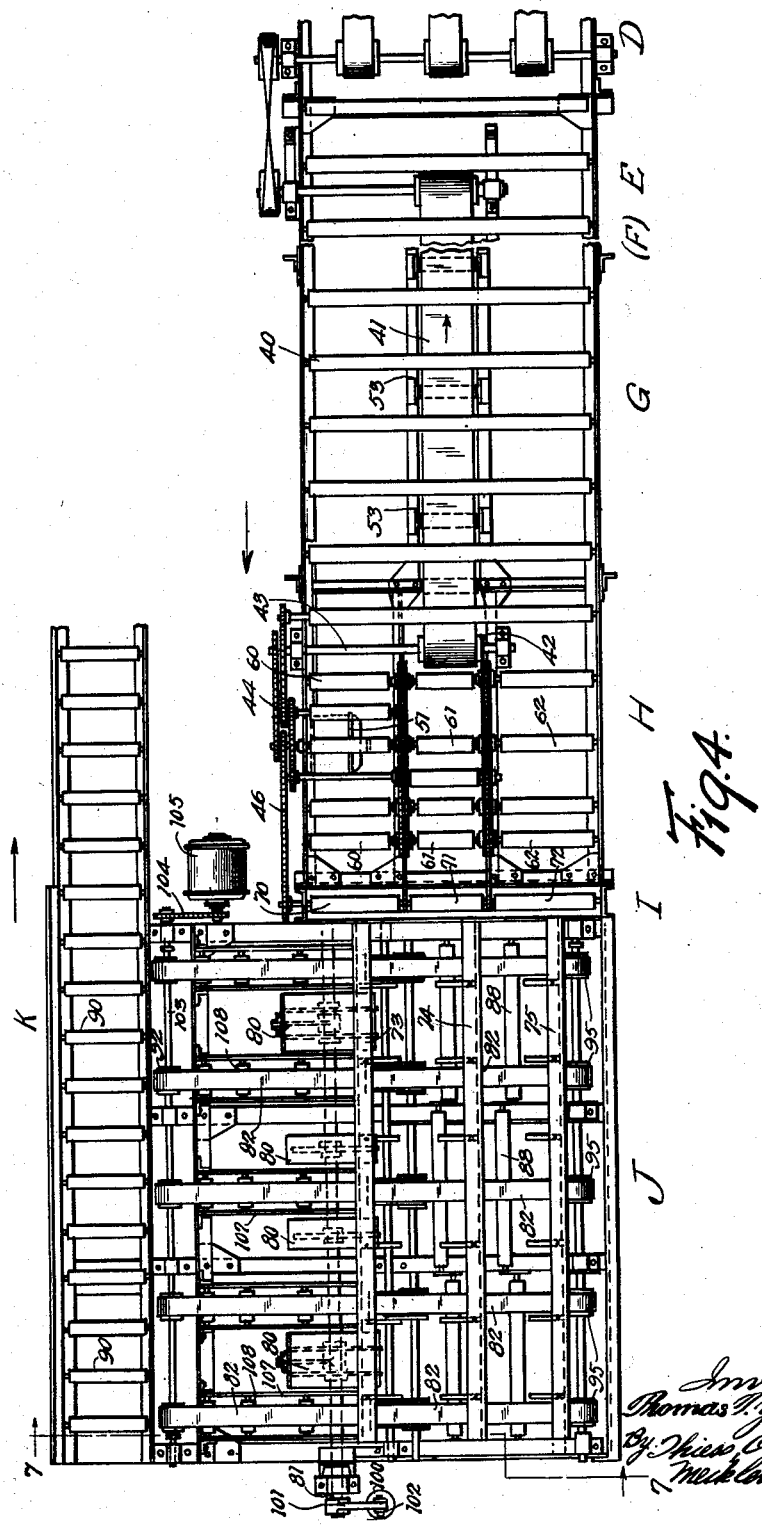

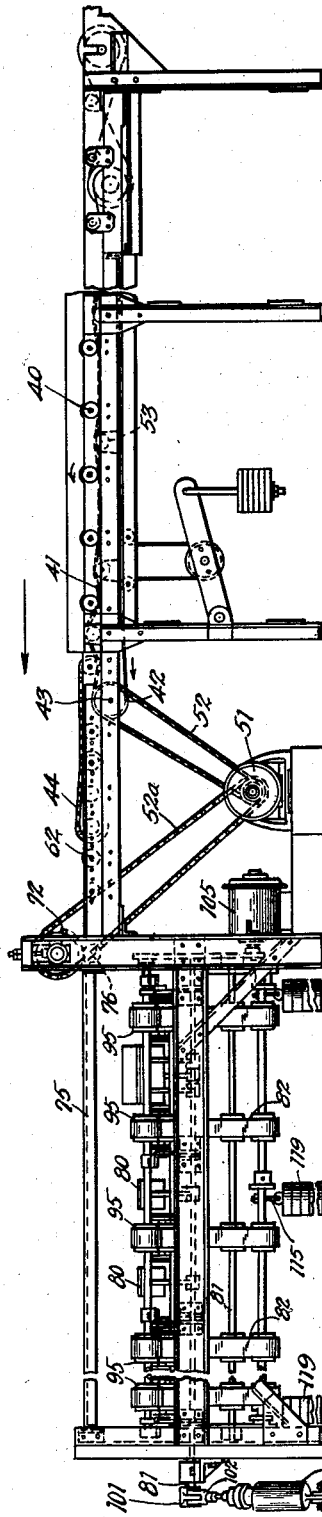

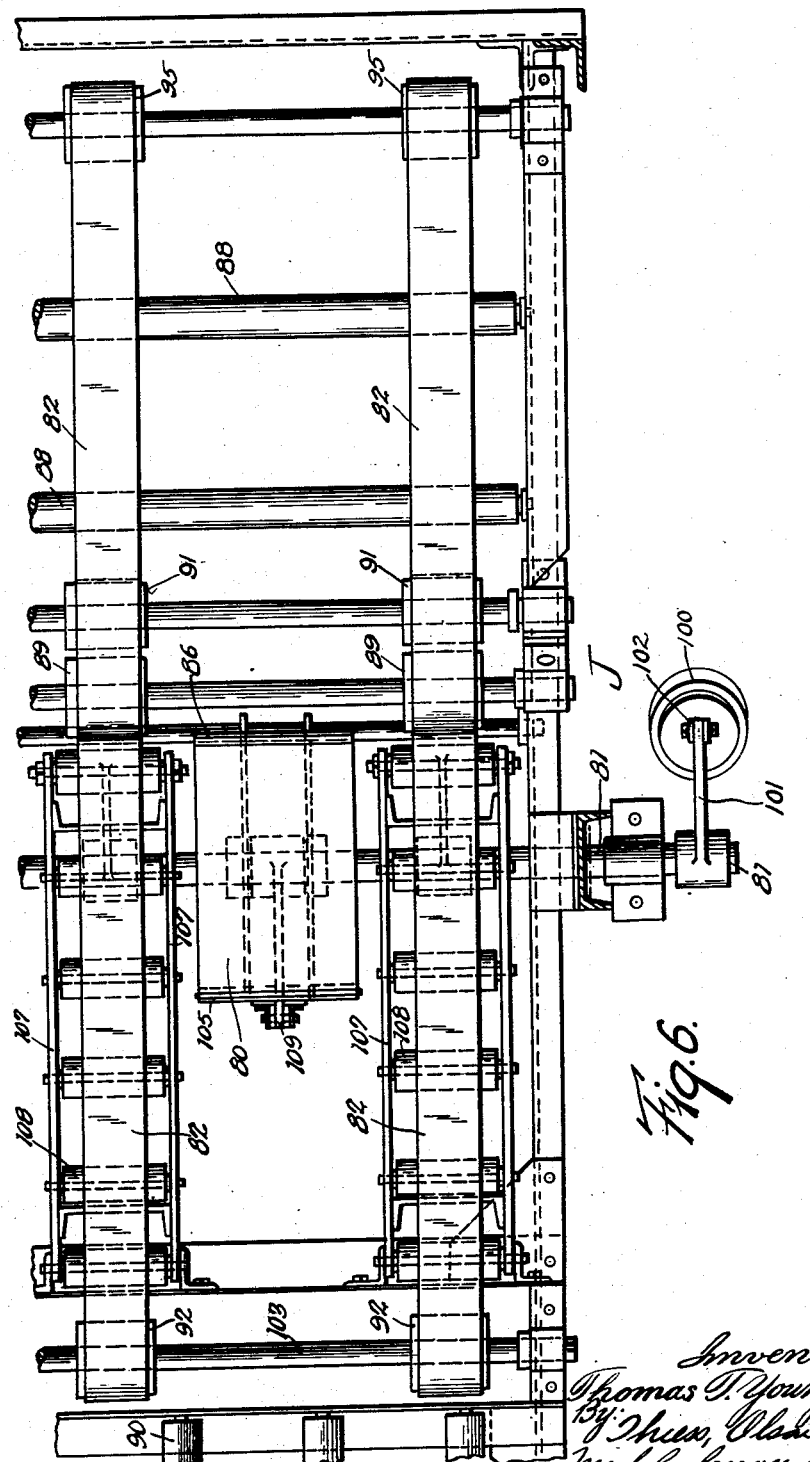

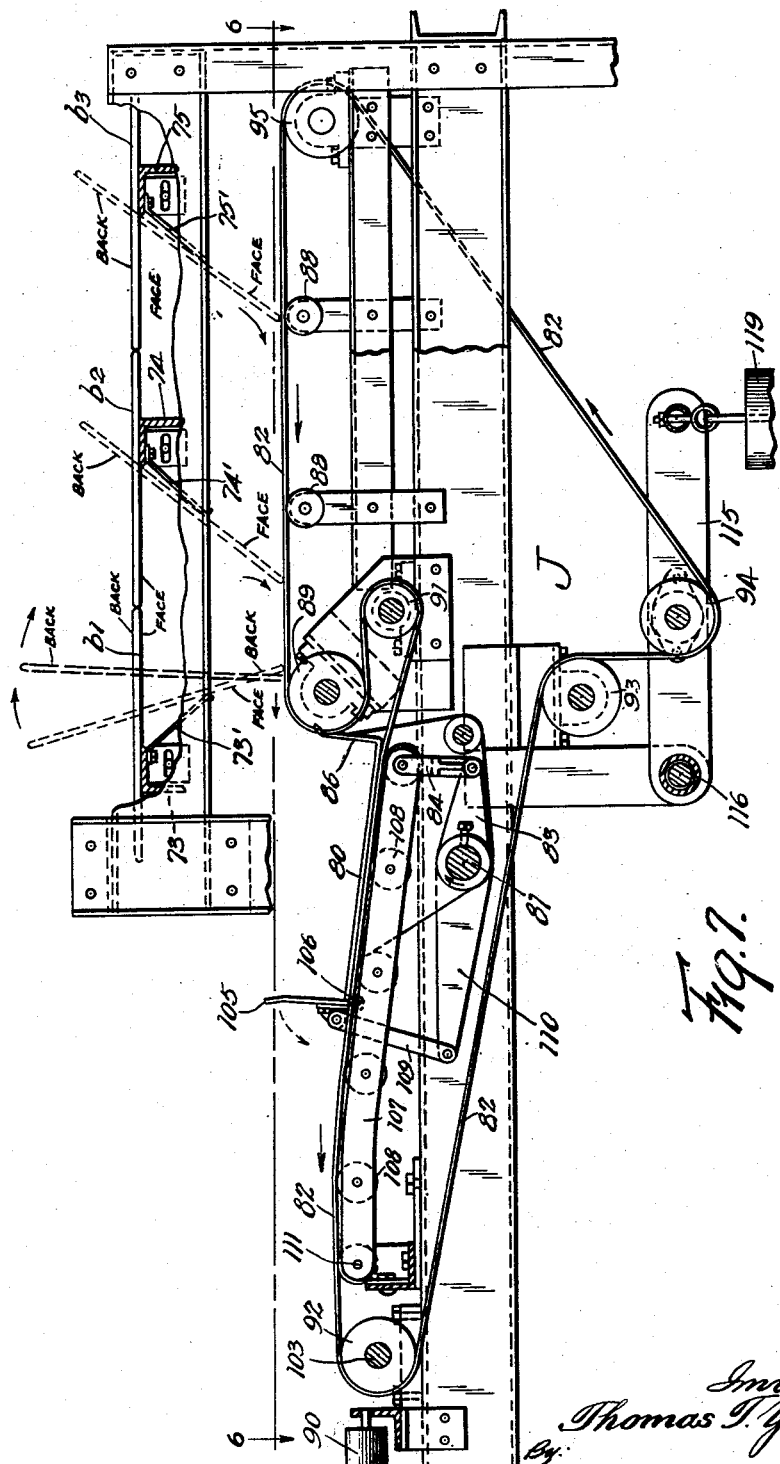

April 20, 1954 T. T. YOUNGFELT 2,675,929
HANDLING SYSTEM FOR BOARDLIKE ARTICLES
Filed June 28, 1946 9 Sheets-Sheet 9

Inventor:
Thomas T. Youngfelt

Patented Apr. 20, 1954

2,675,929

UNITED STATES PATENT OFFICE 2,675,929

HANDLING SYSTEM FOR BOARDLIKE ARTICLES

Thomas T. Youngfelt, Evanston, Ill., assignor to United States Gypsum Company, Chicago, Ill., a corporation of Illinois Application June 28, 1946, Serial No. 680,023

9 Claims. (Cl. 214—6)

The present invention relates to a handling system for board-like articles, especially such as are more or less continuously being discharged from a board-treating instrumentality, as, for example, a drier.

More particularly the invention relates to that type of handling apparatus which will receive a plurality of boards from several superposed levels, will transfer them to a single level, advance them thereon, and eventually stack the boards in a preferred form of arrangement, and then transfer the stack to a point of delivery.

The invention is of particular applicability to the stacking of gypsum boards, commonly known as gypsum wallboards and gypsum lath, which are usually offered to the public in the form of a stack containing a definite number of boards which may, additionally, be suitably fastened together either by being wrapped in paper or held together by means of paper strips or various clamping devices such as suitably shaped clips and the like. Particularly when using the latter system, and where wrapping is not provided, it is advisable to form the stacks with the unpreferred sides of the boards outwardly directed and hence exposed, while the preferred sides, i. e. the ones which are to be presented to the inside of the room in which the boards or laths are to be used, are kept unexposed in the stack, and hence protected from injury and from becoming soiled or marred.

In the continuous production of such boards, it has become more or less standard practice to pass them through a multiple-deck drier; this being true of gypsum-core boards as well as of boards made entirely from wood-pulp, ground wood, and the like. The invention, however, is not limited to the handling of these types of boards, but is considered as being generically directed to the handling of any sufficiently rigid board-like objects or articles which will lend themselves to translatory movement upon rollers, belts or similar conveyors, and which may be turned completely over from their obverse to their reverse sides without buckling or deformation.

Accordingly it is one of the objects of the present invention to provide a handling system comprising various operatively associated and combined instrumentalities, which by their conjoint operations effect the transfer of boards and the like from the decks of a multiple-deck treating instrumentality to a single level, and then stack the boards so that none of the preferred sides will be exposed either at the top or bottom of the resulting stack.

A further object of the invention is to provide an apparatus which will safely, and without injury to the boards transfer them from a plurality of superposed levels to a single level, irrespective as to whether said final single level is below or above the superposed levels.

Still a further object of the invention is to provide an apparatus for selectively accelerating the speed of travel of one or more of a number of boards being transported on substantially the same level, so as to arrange said boards in an echelon, that is with the boards in progressively advanced relation one to the other.

Another object of the invention is to provide an apparatus for completely turning over one of a plurality of boards, to deposit this upon a receiving element, and then to deposit thereupon further boards in their unreversed position, to eventuate a suitable stack having the desired orientation of boards therein.

A further object of the invention is to provide a suitable combination of various transporting, accelerating and reversing means to practice a method in which boards received from a multiple-deck drier or the like are first caused to become deposited upon a single layer conveyor; their respective speeds of travel modified so as to accelerate that of selected boards; then either turned over or not, as desired, stacked into a stack of desired orientation; and the stack conveyed to a desired point of delivery.

Still further objects of the invention will become apparent from the further description and claims hereinbelow set forth when considered in connection with the hereunto appended drawings, in which:

Figs. 1 and 1a, taken together constitute a complete top plan view, partially broken away, of the complete handling system showing the arrangement of the various individual portions thereof;

Fig. 2 is a top plan view, on a somewhat enlarged scale, of the portion of the apparatus designed for transferring board-like articles from the various decks of a board treating instrumentality to a single level;

Fig. 3 is a side elevational view of the apparatus shown in Fig. 2;

Fig. 4 is a top plan view, on a somewhat enlarged scale, of a portion of the apparatus shown in Fig. 1a, by means of which the speed of travel of the boards is accelerated and certain of the boards turned over, and the stack produced;

Fig. 5 is a side elevational view of that portion of the apparatus shown in Fig. 4;

Fig. 6 is a fragmentary sectional view, also on a somewhat enlarged scale, of the portion of the apparatus that turns over and stacks the boards, taken on line 6—6 of Fig. 7.

Fig. 7 is a sectional view of the apparatus shown in Fig. 6, showing the boards as they are being turned over and stacked, taken on line 7—7 of Fig. 4.

Figure 8:
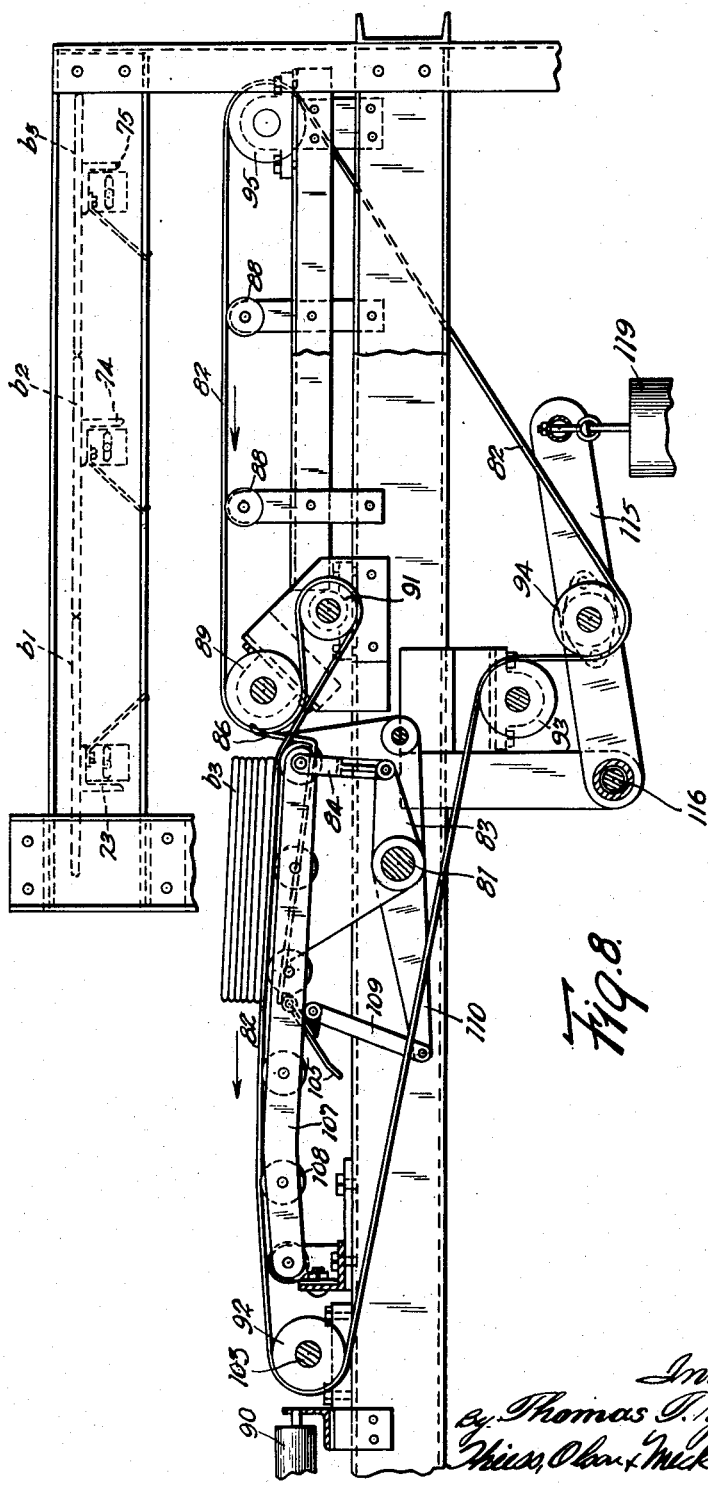
Fig. 8 is a view similar to Fig. 7, but with a stack of boards already accumulated and in process of being further moved.

Considering Figs. 1 and 1a together, they show a conveyor system which starts at the right hand side of Fig. 1 and closely adjoins the cooling section of a board-treating instrumentality, for instance a kiln or drier, here broadly designated by the reference character A. Immediately adjoining this to the left is a separating section, broadly designated as B, this being immediately adjoined on the left by a set of board-removing means such as take-off rolls broadly designated as C, which feed boards into the main cascading conveyor section D, from whence the boards are transferred to a horizontal conveyor system, three rollers of which, broadly designated as E, being seen at the extreme left hand end of Fig. 1, and being continued at the extreme right hand side of Fig. 1a, therein being designated by the same reference character E.

There then follows (Fig. 1a) a side take-off section F which is followed by a short further conveyor section G, to the left of which there is broadly shown, and characterized by the reference character H, a set of aligned accelerating conveyors by means of which boards may be arranged in echelon fashion. Adjoining the accelerating section H there is a row of three pinch take-off rolls I, which feed boards to a board-turning and transporting mechanism broadly designated as J, in which some of the boards are turned over, and the boards formed into a stack, which is then conveyed to a delivery section consisting of a set of rollers K which feed the resulting stack to a further device L which is employed for the purpose of breaking the boards transversely into sections, but which latter forms no part of the present invention, being illustrated merely to show the general orientation of the device relative to the board-treating instrumentalities at the point of their final disposition.

These various sections are designated broadly by similar lettering upon the other figures.

Suitable boards, which may be gypsum wallboards, gypsum lath, or fibrous boards, and which have been treated in the board treating instrumentality A, for example a drier, leave the drier by means of the downwardly inclined horizontally or sometimes upwardly inclined take-off section B, which consists of a plurality of superposed decks of roller conveyors 15, 16, 17, 18, 19, 20, 21 and 22, the end of each of which is, respectively, in direct alignment with the cascade decks 5, 6, 7, 8, 9, 10, 11 and 12, upon which the said boards roll with somewhat greater speed than they have rolled in the drier A and on sections 15–22. One set of positively driven take-off rolls 13 and 14 (similar rolls being associated with each deck, but for sake of simplicity not numbered herein and broadly designated by the reference character C), are operated by means of individual driving means 23, which preferably are motors provided with suitable reducing gears and which actuate the rolls 13 by means either of belts or chains 24. These rolls 13 and 14, actuated by the prime movers 23, may be under the control of an operator so that by actuating any of a set of suitable switches or push buttons he can either start or stop a particular prime mover 23 so as to place boards upon any one of the decks 5 through 12, depending upon the exigencies of the particular situation. For instance, if he desires to transfer a board from the conveyor 18 to the cascade deck 8, he will actuate the prime mover 23 fourth from the top; if he wishes to pull a board from the lowermost conveyor 22 on to the cascade deck 12, he will actuate the lowermost prime mover 23. The two rolls 13 and 14 are driven at the same speed through the intermediation of the secondary belts or chains 25 (see Fig. 2). In order that the boards which have passed rolls 13 and 14 may continue to advance, the decks 5 through 12 are each provided with a plurality of driven rollers 26. The number of rollers 26 on each of the particular decks 5 through 12 differs depending upon the length thereof. Each of these rollers 26 is given positive rotational movement which is imparted thereto by means of the prime mover 27 which may be a suitable motor with its associated reducing gear, and which actuates the lowermost drive roller 28 through the intermediation of a chain or belt 29.

From the main drive roller 28 there extends a belt 30 which drives the first of the smaller conveyor rollers 26, the latter being operatively connected with one another by a series of belts or chains 31, best seen in Fig. 2.

The rotation of these rollers 26 is therefore, when considered in connection with Fig. 3, in a counter-clockwise direction, as a result of which the rollers 26 will have a tendency to convey the boards toward the left. As the boards progress, for instance, along the uppermost deck or conveyor 5, they will soon reach the end thereof, and hence drop downwardly, or as applicant prefers to term it, "cascade," onto the next lower conveyor 6, thence to conveyors 7, 8 and 9, finally arriving on an extension of the lowermost conveyor 12, which extension terminates in the general horizontal conveyor section E, which can only be fully seen in Fig. 1a, except that the immediate beginning thereof is shown at the extreme left end of Figs. 2 and 3.

It will be noticed that the conveyors, beginning with conveyor No. 6, are progressively less inclined and by the time conveyor No. 8 is reached the same is only very slightly inclined. Conveyor No. 9 is substantially horizontal while conveyors Nos. 10 and 11 are slightly upwardly inclined, but not as much as conveyor No. 12. It will readily be apparent that any board which is rolling along on conveyor No. 9 will drop almost immediately on to the end of conveyor 12 and hence on to the horizontal conveyor section E, details of which will be hereinafter more fully described. The lowermost conveyor 12 has an upwardly inclined portion 32 in which the rollers 26 are surmounted by a plurality of endless conveying belts 33, which at one terminal pass over the pulley 34. A suitable tensioning device 35 is shown as consisting of a suitably pivoted lever 36, weight 37, pulley 38 and smaller pulleys 39 and 39a, by means of which each of the belts 33 is kept under adequate tension. As the board arrives at the beginning of the belts 33 of the conveyor 12, it will be picked up by said belts 33 and carried upwardly until it reaches the horizontal conveyor section E, after which it will progress through or along the various instrumentalities until it reaches the station L above referred to.

The apparatus is preferably so operated that the individual boards will arrive upon conveyor section E substantially abreast of each other. As shown in the figures, and merely for purposes of exemplification, however, three boards are to be considered as traveling more or less simultaneously upon the conveyor section E. In order to accomplish this, therefore, an operator must be stationed at the points C or B where he can control the discharge of boards from the various decks of the drier A, for the purpose of obtaining a more or less constant flow of boards on the conveyor section E shown in Fig. 1a. The conveyor section E consists of a plurality of driven rollers 40 which are driven in such a direction that they will transport boards lying thereon in the direction of the arrow (to the left) of Fig. 1a. To accomplish the desired rotation there is provided a belt 41 which underlies the rollers 40 and is suitably kept in contact therewith, the details of this construction being best seen in Figs. 4 and 5.

The said belt 41 is actuated by means of a pulley 42 being keyed on to shaft 43 which is driven through a series of chains or belts 44 by a prime mover 51 and belt 52 (see Fig. 5), whose construction is to all intents and purposes similar to motor 27 shown in Figs. 2 and 3.

At F there are shown (in Fig. 1a) a series of transversely operable belts 50 which serve, if desired, to remove boards at this point of the apparatus, if it is not desired to have them pass through the further instrumentalities G through L. The construction of these belts, however, and the apparatus therewith connected, are entirely outside of the scope of the present invention. Suffice it to say that the belts 50 are so arranged that they may be elevated at desired times so as to lie above the level of the rollers 40 with the result that the belts will contact the boards and move them off the conveyor section F.

The section G has the same function and is of the same nature as the section E, and the two sections may be considered as constituting a single horizontal positively driven conveyor section.

Inasmuch as it is desired to turn certain of the boards over, this is accomplished in sections H, I and J. Section H consists of a plurality of smaller individual rollers 60, 61 and 62 (see Figs. 1a, 4 and 5), which are also driven from motor 51 and belt 52. The belts or chains 44 and 46 are so proportioned that in operation the board which lies on the rollers 60 will be speeded up relatively to the board traveling on the rollers 61, while the board on the rollers 62 will move still more slowly. Sets of positively driven pinch-rolls 70, 71, and 72, beneath which smaller rollers 76 (see Fig. 5) are arranged, with a spacing therebetween just about equal to the thickness of the boards, serve positively to push the boards out on to angle-iron supports 73, 74 and 75 which it will be noticed (see Fig. 7) are so arranged that they will support the boards at a point which is to one side of the center of gravity of the boards, support 73 being to the left of the center of gravity of board $b_1$ fed thereto, and supports 74 and 75 being to the right of the center of gravity of boards $b_2$ and $b_3$, respectively, fed thereto.

Considering that the boards are substantially the length of the section J, the boards cannot drop off the supports 73—75 until they have completely cleared the rollers 70—72, respectively. Immediately they have done so, however, their free unsupported longitudinal edges will drop onto flexible guide fingers 73', 74' and 75' carried by the supports 73, 74 and 75, respectively. In the case of the board which has been supported by the support 73, and which has just cleared the roller 70, the right hand edge thereof will be guided by fingers 73' to engagement with the belts 82 which will carry said edge to the left, thereby causing the board to be completely turned over and then conveyed to and dropped into a receiving mechanism which comprises a receiving pan 80 (see Fig. 7). The left hand edges of the boards falling from the supports 74 and 75 will also encounter the belts 82 which pull the boards completely off the supports so that the previously supported edges of said boards will now also drop and the boards will fall upon belts 82 which transport them to the left (see Fig. 7) until they fall on top of the first board, which has been completely turned over. By means of a suitable thruster 100, the belts 82 are brought into contact with the stack and move it to the left (see Fig. 8) and place the entire stack upon the conveyor section K (see Fig. 4) which is provided with a plurality of free rollers 90. The pan 80 is made in four sections, as seen in Fig. 4, in order to provide spaces between the sections for the belts 82. At this point the stack may be pushed to the right until it arrives on section L (see Fig. 1a), where the boards may be given any desired treatment or removed for shipping.

The boards handled by the apparatus of the present invention are usually paper covered and have a desired or preferred surface and an undesired or unpreferred surface. In making up bundles of such boards, particularly where metallic clamping means are employed, such clamping or securing means engage only with the edge portions of the stack of boards, leaving the outside surfaces of the top and bottom boards exposed. Such surfaces may be easily marred in shipment and handling of the bundle, and therefore should not be the sides of the boards which are exposed when the boards are put to use. In order that the preferred sides of the boards shall not be injured during the manufacture thereof, the board manufacturing apparatus and the drier A are so designed and operated that the boards issue from the drier with the preferred side down and the unpreferred side up. This is advantageous as it will avoid marring the preferred side as by grease, dirt or other things dropping on to the boards as they progress through the apparatus. However, by completely turning over the first board, the side which had been the bottom or preferred side now lies uppermost, therefore having the unpreferred side facing down. Other boards may then be piled on top thereof to form a stack of, say, three boards, although in actual practice it has been found advantageous to build up a stack of six boards.

With the apparatus constructed as herein shown, the fourth board of the stack will also be turned over, while the fifth and sixth boards will not be turned over. It is customary to build up a stack of six boards, as this makes a bundle which is not too heavy for convenient handling. However, a stack of any desired number of boards can be built up by a machine constructed in accordance with the present teachings.

A more detailed disclosure of the portions of the device shown broadly in Fig. 1a is to be found in Figs. 4, 5, 6, 7 and 8.

Referring first to the instrumentality broadly designated as H, and which for the sake of convenience will be referred to as the "accelerating section," this comprises the already mentioned rollers 40 and the belt 41 which is actuated by the motion of the pulley 42. This belt 41 is so driven that it will underlie the rollers 40 being pressed thereagainst by secondary rollers 53. The belt 41 moves with the upper side traveling to the right as a result of which, of course, the rollers 40 will be operated in a counter-clockwise direction, thereby advancing the board to the left, as indicated generally by the arrow in Figs. 4 and 5. For the sake of simplicity, no boards are here shown on the machine.

The accelerating section H can be more clearly seen in Figs. 4 and 5, wherein the chains 44 and 46 are illustrated on a somewhat larger scale. The rollers 60, 61 and 62 are respectively arranged to travel at different speeds, rollers 60 traveling the fastest, rollers 61 at an intermediate speed, and rollers 62 at the slow speed. This therefore will bring boards which are advancing on the rollers 60 first to the pinch-roller 70 by means of which the board, in cooperation with the underlying smaller roller 76, is pushed out on to the support 73, and the second board traveling on rollers 61 will next encounter pinch-roller 71 and the corresponding underlying roller and will be pushed out on to the support 74; while the third board traveling on rollers 62 will then be pushed out by means of pinch-roller 72 and underlying cooperating roller on to the support 75.

The turning over of the boards, as accomplished in section J, comprises, in further detail, the following instrumentalities and operations.

After the boards leave the respective pinch rollers 70, 71 and 72, they will be pushed out on to the angle-iron supports 73, 74 and 75. It will be noticed that these supports are the full length of the boards, but that they are not aligned with the center of the respective rollers 70, 71, and 72, but are displaced to one side, the support 73 being displaced to the greatest extent.

The boards are therefore supported on these supports and at the same time are kept from falling from the supports by the engagement of the boards with the rollers 70, 71 and 72. However, the moment that the board is released by, for instance, the pinch roller 70, it will fall with its right hand edge downwardly (see Fig. 7), the edge being engaged by the belts 82 which effect complete overturning of the board so that when it is delivered to pan 80 it will be in a position with its face up. Similarly, the board riding on support 74 will drop therefrom after the end of the board has left the pinch roller 71, and the board riding on support 75 will drop when it has passed through and has been released by pinch roller 72; but this board will not turn over.

The operation which then follows can best be understood from a consideration of Figs. 5, 6, 7 and 8. As best seen in Fig. 7, the boards marked respectively $b_1$, $b_2$, $b_3$ are shown first in full lines in the position in which they are arriving on the angle-iron supports 73, 74 and 75, it being of course understood that board $b_1$ arrives at the end of the support first, $b_2$ second, and $b_3$ third. The boards are shown in dotted line position as they are falling from the supports; board $b_1$ being delivered by belts 82 to the pan 80 in reversed position, that is with its unpreferred side facing downwardly in the pan. The second board, $b_2$, falling from the support 74, will encounter with its left hand edge the moving belts 82. These belts pass respectively over pulleys 89 then around pulleys 91 and travel along a plane underneath the pan 80 on a number of supporting rollers 108, thence passing over driven rollers 92 at the extreme left end of their travel, then returning in a downwardly direction and to the right, eventually passing over pulleys 93 and 94, and then over pulleys 95. These belts will therefore tend to pull the left hand edge (as seen in Fig. 7) of board $b_2$ toward the left so that the board will fall flat on to the belts 82 with the unpreferred side uppermost and therefore with its face (so marked on Fig. 7) down. By reason of the travel of the belts 82 the board will be pushed out until it will fall into the pan 80. A stop 105, hinged at 106, is provided at the left hand side of the pan for the purpose of limiting the travel of the board propelled into the pan by the belts 82. The result will therefore be the deposition of board $b_2$ with its face against the face of the board $b_1$ which by that time will be lying in the pan 80. Shortly thereafter, board $b_3$ will likewise fall on to the belts 82 in a manner entirely similar to that of $b_2$ and hence will be deposited face down on top of board $b_2$ in the pan 80. The next board which then arrives will also be a board $b_1$ which will then be deposited face up on the three boards already in the pan to be followed by a second set of boards $b_2$ and $b_3$ which will be deposited, of course, face downwardly. There will thus be an accumulation of six boards in the pan 80, the bottom one being with its reverse side against the bottom of the pan and the top one with its reverse side upwardly. This, therefore, eventuates a bundle which can be handled without damage to the preferred faces of the boards. A suitable stop 86 keeps the boards from sliding rearwardly out of the pan 80. As can best be seen in Fig. 4, the pan 80, as before mentioned, is made up of four laterally spaced sections, the two outer ones being somewhat wider than the others. This sectional construction is necessary in order to allow the belts 82 to be brought upwardly into engagement with the bottom of the stack when it is desired to transport the same out of the pan 80. Only the two outside pan sections are provided with the hinged stops 105.

Those portions of belts 82 which underlie the pan 80 and extend some distance to the left thereof, are supported by a plurality of freely rotating rollers 108 which are carried by suitable shafts that are mounted in beams 107. The latter are pivotally supported at 111.

Each of the belts 82 (as seen in Fig. 7) is kept taut by reason of the relationship of the pulleys 93 and 94, over which it passes, the latter pulley being carried by an arm 115 pivotally mounted at one end on the shaft 116, the free end of the arm being provided with a weight 119.

The stops 105 on the pan 80 are capable of being pulled downwardly by means of the links 109 which are pivoted to arms 110 which are keyed to the shaft 81 which also carries arms 83 which are connected, by means of the links 84, to the right hand or free ends of the beams 107, so that the said beams, together with the rollers 108 thereon and the thereby supported belts 82, may be pushed upwardly into the spaces between the sections of pan 80 for the purpose of engaging the bottom of the stack of boards accumulated in the pan. This changed position is best seen in Fig. 8, in which the beams 107 with their rollers 108 thereon are shown in their uppermost position, whereby the belts 82 have now engaged the bottom of the stack of boards, and the arms 83 have been moved to their uppermost positions. The shaft 81 has made a partial rotation to the left, and has therefore rocked the arms 110 downwardly, which in turn have pulled down links 109, thereby swinging stops 105 downwardly so that the latter now completely clear the adjacent edge of the stack of boards. Accordingly, the stack of boards can now travel on the belts 82 in the direction of the arrow, and eventually become deposited upon the set of transverse rollers 90. At the same time the arms 115 with their attached weights 119 will have moved into their uppermost positions, to accommodate the belts 82 and keep them taut.

Once the stack of boards has been delivered upon the rollers 90, the shaft 81 is rotated to the right so that the various parts will reassume the positions shown in Fig. 7.

The means for actuating the shaft 81 comprise a thruster 100 which can best be seen at the extreme left of Figs. 4 and 5. This thruster may be either pneumatically or electrically operated, and may, for example, be an air cylinder or a solenoid, the entire object of the thruster being to effect the movement of the shaft 81 to the extent indicated, this being accomplished by having the thruster attached to a rocker arm 101 which is keyed to the shaft 81, and the free end of said arm being attached to the reciprocating rod 102 of the thruster. The operation of the thruster is under the control of an operator stationed near the end of the machine, and in full sight of its operation.

The belts 82 are operated by positively driving pulleys 92 which are keyed to a shaft 103, which shaft is actuated through a suitable chain or belt 104 (Fig. 4) from a prime mover such as a motor 105. The belts 82, however, are continuously in operation, and of course when the device is in the position shown in Fig. 7, serve the function of receiving and transporting the boards $b_2$ and $b_3$ falling from the supports 74 and 75, while when they are not receiving these boards, they perform the function of transporting the stack to the rollers 90.

The entire method of procedure therefore comprises receiving a plurality of boards from the superposed decks of, for instance, a board drier, conveying the boards over individual cascading conveyors to a single conveyor, then accelerating the speed of travel of selected boards so that they may be arranged in echelon fashion, that is to say, one board ahead of the other, whereafter the most advanced board is turned over mechanically, other boards piled on top of it, and a stack eventuated, which stack is then transversely moved to a point of delivery.

The apparatus may be constructed of any suitable material, but preferably is made from iron or steel, and the rollers are preferably also made of metallic material, although if desired they may be made of wood or plastics. Those rolls or rollers which exert initial motivating force upon the boards may, if desired, be covered with a material having a greater coefficient of friction, such for example as soft rubber or felt, this being particularly desirable in case of the pinchrolls 70, 71 and 72.

Obvious modifications of the present invention are to be regarded as coming within the scope of my invention, and the exact number of decks in the take-off sections B, and C, and the conveyor section D are of course subject to variation, and while eight such superposed conveyors have been shown, it will be self-evident that the invention is not limited thereto, but comprehends such apparatus and methods as may be carried out within the scope and purview of the hereunto appended claims, in which the inventor claims as his invention:

1. A handling system for board-like articles comprising a series of cascading superposed roller conveyors for receiving said articles from a plurality of superposed levels and conveying them to a single level; a conveyor at said level for conveying said articles in horizontally aligned position; means on said latter conveyor for selectively accelerating the travel of one or more of said articles relative to each other; means fed by said latter conveyor for dropping and reversing said articles and for superimposing at least two other of said articles directly upon said reversed article to produce a stack thereof; and a conveyor for conveying said stack to a point of delivery.

2. A handling system for board-like articles comprising a series of cascading superposed roller conveyors for selectively receiving said articles from a plurality of superposed levels in which said articles are individually supported and conveying them to a single level; a conveyor at said level for conveying said articles in horizontally aligned position in a single plane; means on said latter conveyor for selectively accelerating the travel of said articles relatively to another; means fed by said latter conveyor for dropping and for stacking said articles upon each other to produce a stack thereof; and a conveyor for transferring said stack to a point of delivery.

3. A handling system adapted to receive, convey and stack board-like articles from a multiple deck board-treating instrumentality which comprises a series of cascading conveyors for selectively transferring boards from the decks of said instrumentality to a substantially horizontal conveyor on which said articles lie abreast in a single plane; accelerating means aligned with said horizontal conveyor for selectively accelerating the travel of at least one of said articles relatively to each other; dropping and reversing means for turning over at least one of said articles and for stacking the other of said articles on top of said turned over article to eventuate a stack thereof; and a conveyor for transferring said stack to a point of delivery.

4. A discharge apparatus for transferring board-like articles from a board-treating instrumentality in which boards are simultaneously conveyed at a plurality of superposed levels to a single horizontal conveyor, which comprises an equal number of discharge-conveyors whose ends are individually aligned with the respective levels of said instrumentality, some of said discharge-conveyors being downwardly inclined, some level and some upwardly inclined, the lowest conveyor being the longest and the other conveyors being of shorter length and arranged so that their ends overlie said lowest conveyor; means on said conveyors for positively impelling the board-like articles thereon whereby all the articles will eventually reach and be conveyed on the lowermost conveyor; feed-rolls at the receiving end of all the conveyors; individual driving means for said feed rolls; and means for selectively operating said driving means.

5. A discharge apparatus for transferring boards from a multi-level drier to a horizontal conveyor which comprises a superposed set of discharge-conveyors whose receiving ends are aligned with the respective levels of said drier, the uppermost of said discharge-conveyors being downwardly inclined, the adjacent series of discharge-conveyors being horizontal and the lowermost discharge-conveyor being upwardly inclined and of the greatest length and eventuating in a horizontal transporting-conveyor; the uppermost discharge-conveyor being, respectively, progressively longer, the discharge-conveyors of the next adjacent series being progressively shorter; individually actuatable pull-out rolls at the receiving end of each conveyor; means on all of said conveyors for impelling boards thereon; and a control mechanism for individually and selectively actuating said pull-out rolls.

6. The apparatus claimed in claim 5 wherein the lowermost conveyor is provided with means for conveying boards upwardly onto the transporting conveyor.

7. Method of stacking board-like articles which have been treated at a plurality of superposed levels in a board-treating instrumentality which comprises cascading said articles from the respective levels progressively to a single level; conveying said articles horizontally in aligned position; accelerating the travel of said articles relatively to each other; turning over one of said articles with its upper side down; stacking a plurality of unturned articles on top of the turned-over one to eventuate a stack; and conveying said stack to a point of delivery.

8. A handling system for selectively transferring board-like articles from a plurality of superposed levels to a single substantially horizontal level which comprises a plurality of superposed conveyors having their receiving ends individually aligned with said superposed levels, the uppermost of said conveyors being the shortest while those below said uppermost conveyor are progressively longer, the longest being substantially horizontal, and still lower conveyors which are progressively shorter, and an upwardly inclined conveyor having an eventual longer horizontal portion, whereby articles transported on the shorter conveyors will drop from the end of a shorter conveyor onto the last mentioned longer conveyor and thus eventually arrive on the substantially horizontal level.

9. A discharge device for a drier on which board-like articles are dried while progressing on a plurality of superposed levels which comprises a plurality of superposed roller conveyors having their receiving ends in alignment with the respective levels of the drier so as to receive boards therefrom; pull-out rolls on the receiving ends of each of said conveyors; the uppermost conveyor being of a certain length and slightly downwardly inclined, the next lower conveyor being longer and having its end projecting for a considerable distance beyond that of the conveyor above it; successively lower conveyors being progressively longer, the longest being substantially horizontal; lower conveyors being progressively shorter and substantially horizontal, terminating in a slightly upwardly inclined lowermost conveyor.

References Cited in the file of this patent

UNITED STATES PATENTS

| Number | Name | Date |
|--------|------|------|
| 1,749,262 | Roark | Mar. 4, 1930 |
| 1,869,210 | Moore | July 26, 1932 |